(12) United States Patent
Kimura et al.

(10) Patent No.: US 10,955,233 B2
(45) Date of Patent: *Mar. 23, 2021

(54) THICKNESS MEASURING APPARATUS (71) Applicant: DISCO CORPORATION, Tokyo (JP)

(72) Inventors: Nobuyuki Kimura, Tokyo (JP); Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,067

(22) Filed: Dec. 17, 2019

(65) Prior Publication Data

US 2020/0208963 A1 Jul. 2, 2020

(30) Foreign Application Priority Data

Dec. 27, 2018 (JP) .............................. JP2018-244828

(51) Int. Cl.
*G01B 11/02* (2006.01)
*G01B 11/06* (2006.01)

(52) U.S. Cl.
CPC .................................. *G01B 11/06* (2013.01)

(58) Field of Classification Search
CPC ................. G01B 11/06; G01B 11/0675; G01B 9/02021; G01B 9/0209; G01B 2290/20
See application file for complete search history.

(56) References Cited

U.S. PATENT DOCUMENTS

| 7,187,816 B2* | 3/2007 | Huang | G01D 5/35303 |
| | | | 385/12 |
| 2006/0126076 A1* | 6/2006 | Mueller | G01B 11/0675 |
| | | | 356/512 |
| 2007/0091317 A1* | 4/2007 | Freischlad | G01B 11/0675 |
| | | | 356/511 |
| 2008/0170243 A1* | 7/2008 | Nomaru | B23K 26/032 |
| | | | 356/634 |
| 2012/0176623 A1* | 7/2012 | Lee | G01B 9/0209 |
| | | | 356/503 |
| 2018/0252518 A1* | 9/2018 | Chalmers | G01B 11/0675 |
| 2020/0072598 A1* | 3/2020 | Hsu | G01N 21/211 |

FOREIGN PATENT DOCUMENTS

| JP | 2011122894 A | 6/2011 |
| JP | 2012021916 A | 2/2012 |

* cited by examiner

*Primary Examiner* — Tarifur R Chowdhury
*Assistant Examiner* — Jonathon Cook
(74) *Attorney, Agent, or Firm* — Greer Burns & Crain Ltd.

(57) ABSTRACT

A thickness measuring apparatus including a thickness measuring unit for measuring the thickness of a plate-shaped workpiece. The thickness measuring unit includes a white light source for emitting white light, a dispersing mechanism for producing time differences corresponding to wavelengths of light components of the white light to thereby generate spectral light, a two-dimensional image sensor having a photodetecting area for detecting the return light, the photodetecting area including a plurality of pixels, a storing section for storing the intensity of the return light detected by the plural pixels according to wavelength with time difference, a waveform table previously storing a plurality of kinds of sample spectral interference waveforms respectively corresponding to different thicknesses of the workpiece, and a thickness deciding section for deciding the thickness at an X-Y coordinate position in a two-dimensional area of the workpiece.

3 Claims, 5 Drawing Sheets

WAVEFORM TABLE

| THICKNESS ($\mu$m) | SAMPLE SPECTRAL INTERFERENCE WAVEFORM |
|---|---|
| 5 |  |
| 10 |  |
| 15 |  |
| ⋮ | ⋮ |
| 100 |  |
| ⋮ | ⋮ |
| 355 |  ─ S |
| ⋮ | ⋮ |
| 495 |  |
| 500 |  |

THICKNESS MEASURING APPARATUS

BACKGROUND OF THE INVENTION

Field of the Invention

The present invention relates to a thickness measuring apparatus for measuring the thickness of a plate-shaped workpiece.

Description of the Related Art

A plurality of devices such as integrated circuits (ICs) and large-scale integrated circuits (LSIs) are formed on the front side of a wafer so as to be separated from each other by a plurality of crossing division lines. The back side of the wafer having the plural devices on the front side is ground by a grinding apparatus to thereby reduce the thickness of the wafer. Thereafter, the wafer is divided along the division lines by a dicing apparatus or a laser processing apparatus to obtain individual device chips. The device chips thus obtained are used in various electrical equipment such as mobile phones and personal computers.

The grinding apparatus for grinding the back side of the wafer includes a chuck table for holding the wafer, a grinding unit having a rotatable grinding wheel for grinding the wafer held on the chuck table, and a measuring unit for measuring the thickness of the wafer held on the chuck table, whereby the thickness of the wafer can be reduced to a desired thickness.

As the measuring unit provided in the grinding apparatus for measuring the thickness of the wafer, there is a contact type measuring unit using probe (sensor terminal) adapted to come into contact with the upper surface of the wafer (the work surface to be ground), thereby measuring the thickness of the wafer. However, when such a contact type measuring unit is used, the upper surface (the work surface) of the wafer may be damaged by the probe. To cope with this problem, a noncontact type measuring unit is conventionally used (see Japanese Patent Laid-Open No. 2012-021916, for example). The noncontact type measuring unit is configured so that light is applied to the work surface of the wafer and a spectral interference waveform is produced from an optical path difference between the light reflected on the work surface of the wafer and the light transmitted through the wafer and reflected on the lower surface of the wafer, thereby measuring the thickness of the wafer.

The measuring unit for measuring the thickness of the wafer is also used in a laser processing apparatus for forming a modified layer inside the wafer by applying a laser beam having a transmission wavelength to the wafer in the condition where the focal point of the laser beam is set inside the wafer, whereby the thickness of the wafer can be measured accurately. Accordingly, the focal point can be accurately set at a desired position from the upper surface of the wafer (see Japanese Patent Laid-Open No. 2011-122894, for example).

SUMMARY OF THE INVENTION

The techniques disclosed in Japanese Patent Laid-Open No. 2012-021916 and Japanese Patent Laid-Open No. 2011-122894 are configured so that light is applied to one point on the wafer whose thickness is to be measured, and reflected light from the upper surface and the lower surface of the wafer is dispersed by a diffraction grating to obtain spectral light and produce a spectral interference waveform according to the intensity of the spectral light, in which the spectral interference waveform is processed by computation such as Fourier transform. Accordingly, the thickness of the wafer is detected locally. In the case of measuring the thickness of the wafer over the entire surface thereof, the light is scanned on the entire surface of the wafer to measure the thickness of the wafer at plural points. That is, the thicknesses at the plural points must be computed one by one, causing a reduction in efficiency.

It is therefore an object of the present invention to provide a thickness measuring apparatus which can efficiently measure the thickness of a plate-shaped workpiece in a wide area.

In accordance with an aspect of the present invention, there is provided a thickness measuring apparatus for measuring a thickness of a plate-shaped workpiece having an upper surface and a lower surface, including: a chuck table for holding the workpiece; and a thickness measuring unit measuring the thickness of the workpiece held on the chuck table in a noncontact fashion, in which the thickness measuring unit includes a white light source for emitting white light, dispersing means producing time differences corresponding to wavelengths of light components of the white light emitted from the white light source, thereby generating spectral light, the spectral light generated by the dispersing means being applied to a two-dimensional area on the workpiece held on the chuck table at a predetermined inclination angle, the two-dimensional area being composed of a plurality of sections defined by X coordinates and Y coordinates, a two-dimensional image sensor having a photodetecting area for detecting return light obtained by reflecting the spectral light on the upper surface of the workpiece and the lower surface of the workpiece, the photodetecting area including a plurality of pixels defined by X coordinates and Y coordinates so as to respectively correspond to the X coordinates and the Y coordinates defining the plurality of sections of the two-dimensional area on the workpiece, a storing section for storing intensity of the return light detected by the plurality of pixels according to wavelength with time difference, the intensity of the return light detected by each pixel being stored as a spectral interference waveform, a waveform table previously storing a plurality of kinds of sample spectral interference waveforms respectively corresponding to different thicknesses of the workpiece, and a thickness deciding section for deciding a thickness at an X-Y coordinate position in the two-dimensional area of the workpiece, in which the thickness deciding section decides the thickness as an actual thickness by comparing the spectral interference waveform stored in the storing section with each sample spectral interference waveform stored in the waveform table, next deciding a thickness corresponding to the sample spectral interference waveform coinciding with the spectral interference waveform as a temporary thickness, and next multiplying the temporary thickness by a $\cos \theta$, where $\theta$ is a refraction angle of the spectral light applied to the upper surface of the workpiece and advancing in the workpiece toward the lower surface thereof.

Preferably, the thickness measuring unit further includes a magnifying optical system interposed between the dispersing means and the workpiece held on the chuck table for enlarging a beam diameter of the spectral light generated from the dispersing means, and a focusing optical system for reducing a beam diameter of the return light reflected from the workpiece held on the chuck table and then guiding the return light to the two-dimensional image sensor. Preferably, the white light source is selected from a group consisting of a super luminescent diode (SLD) lamp, an amplified spontaneous emission (ASE) lamp, a super continuum (SC) lamp, a light emitting diode (LED) lamp, a halogen lamp, a xenon lamp, a mercury lamp, and a metal halide lamp.

According to the thickness measuring apparatus of the present invention, the thicknesses in a wide area of the workpiece can be measured at one time. Since the thicknesses in a wide area of the workpiece can be measured, a processing apparatus including the thickness measuring apparatus can efficiently perform any processing using information regarding the thickness of the workpiece.

The above and other objects, features, and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
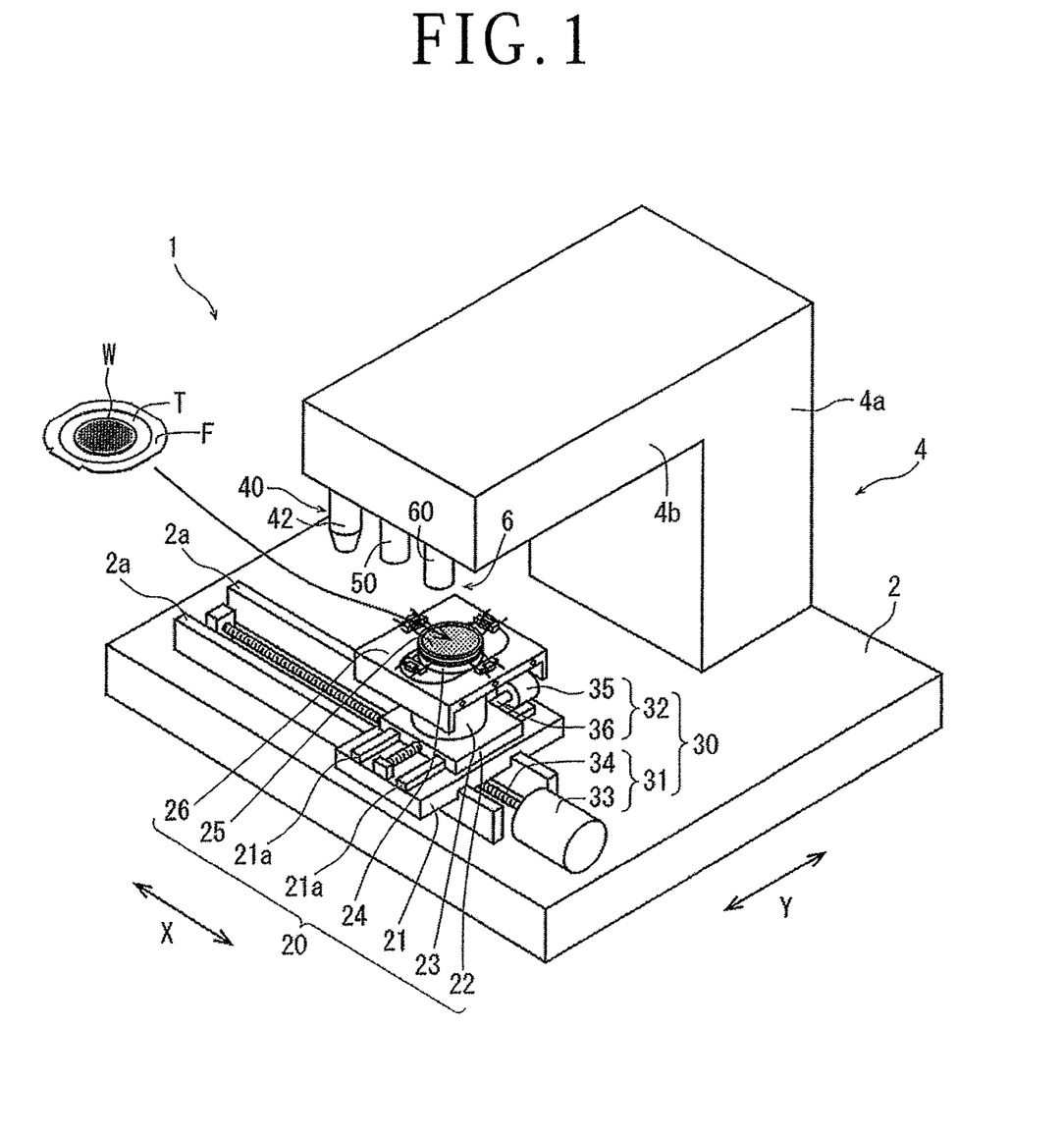
FIG. 1 is a perspective view of a laser processing apparatus including a thickness measuring apparatus according to a preferred embodiment of the present invention.

There will now be described in detail a thickness measuring apparatus according to a preferred embodiment of the present invention and a processing apparatus including the thickness measuring apparatus with reference to the attached drawings. FIG. 1 is a perspective view of a laser processing apparatus 1 for forming a modified layer inside a plate-shaped workpiece (e.g., wafer W formed of silicon) by applying a laser beam to the wafer W in the condition where the focal point of the laser beam is set inside the wafer W, the laser beam having a transmission wavelength to the wafer W.

As illustrated in FIG. 1, the wafer W is supported through a protective tape T to a ring frame F. The laser processing apparatus 1 includes a holding unit 20 for holding the wafer W supported through the protective tape T to the ring frame F, a moving mechanism 30 for moving the holding unit 20, a laser beam applying unit 40 for applying a laser beam to the wafer W held by the holding unit 20, alignment means 50, and a thickness measuring apparatus 6 including a thickness measuring unit 60.

The laser processing apparatus 1 has a base 2. The holding unit 20 includes a rectangular X movable plate 21 mounted on the base 2 so as to be movable in the X direction illustrated by an arrow X in FIG. 1, a rectangular Y movable plate 22 mounted on the X movable plate 21 so as to be movable in the Y direction illustrated by an arrow Y in FIG. 1, a cylindrical support column 23 fixed to the upper surface of the Y movable plate 22, and a rectangular cover plate 26 fixed to the upper end of the support column 23. The cover plate 26 has an elongated hole, and a circular chuck table 24 is supported to the upper end of the support column 23 so as to extend through the elongated hole of the cover plate 26. The elongated hole is elongated in the Y direction. The chuck table 24 has an upper surface for holding the wafer W. The chuck table 24 is rotatable by rotational drive means (not illustrated). The upper surface of the chuck table 24 is provided with a circular vacuum chuck 25 formed of a porous material. The vacuum chuck 25 has a substantially horizontal upper surface for holding the wafer W under suction. The vacuum chuck 25 is connected through a suction passage (not illustrated) to suction means (not illustrated) for producing a vacuum. The suction passage is formed inside the support column 23. The chuck table 24 is provided with a plurality of clamps for fixing the ring frame F supporting the wafer W through the protective tape T. The X direction and the Y direction are perpendicular to each other in a substantially horizontal plane. That is, a substantially horizontal plane is defined by the X direction and the Y direction.

The moving mechanism 30 is provided on the base 2 (stationary base). The moving mechanism 30 includes an X moving mechanism 31 for moving the chuck table 24 in the X direction as a feeding direction and a Y moving mechanism 32 for moving the chuck table 24 in the Y direction as an indexing direction. The X moving mechanism 31 includes a pulse motor 33 and a ball screw 34 adapted to be rotated by the pulse motor 33, in which a rotary motion by the pulse motor 33 is converted into a linear motion by the ball screw 34 and then transmitted to the X movable plate 21. Accordingly, the X movable plate 21 can be moved back and forth in the X direction along a pair of guide rails 2a provided on the base 2, in which the guide rails 2a are slidably engaged with a pair of grooves formed on the lower surface of the X movable plate 21. Similarly, the Y moving mechanism 32 includes a pulse motor 35 and a ball screw 36 adapted to be rotated by the pulse motor 35, in which a rotary motion by the pulse motor 35 is converted into a linear motion by the ball screw 36 and then transmitted to the Y movable plate 22. Accordingly, the Y movable plate 22 can be moved back and forth in the Y direction along a pair of guide rails 21a provided on the upper surface of the X movable plate 21, in which the guide rails 21a are slidably engaged with a pair of grooves formed on the lower surface of the Y movable plate 22. Although not illustrated, the X moving mechanism 31 for moving the chuck table 24 in the X direction, the Y moving mechanism 32 for moving the chuck table 24 in the Y direction, and the rotational drive means for rotating the chuck table 24 are respectively provided with X position detecting means for detecting the X position of the chuck table 24 in the X direction, Y position detecting means for detecting the Y position of the chuck table 24 in the Y direction, and rotational position detecting means for detecting the rotational position of the chuck table 24. Thus, the X position, Y position, and rotational position of the chuck table 24 can be accurately detected by these position detecting means. Detection signals from these position detecting means are transmitted to a control unit 10 (see FIG. 2) which will be hereinafter described. According to control signals output from the control unit 10, all of the X moving mechanism 31, the Y moving mechanism 32, and the rotational drive means are driven to thereby set the chuck table 24 to an arbitrary X coordinate position, arbitrary Y coordinate position, and arbitrary rotational angle.

The control unit 10 is configured by a computer, which includes a central processing unit (CPU) for computing according a control program, a read only memory (ROM) previously storing the control program, a random access memory (RAM) for temporarily storing detection values, computation results, etc., an input interface, and an output interface (details of these components are not illustrated). The control unit 10 functions as a control unit for controlling all the operational components of the laser processing apparatus 1 mentioned above and also functions as a storing section 120, a thickness deciding section 130, and a waveform table 140 in the thickness measuring apparatus 6 to be hereinafter described.

Referring to FIG. 1, an inverted L-shaped support member 4 is provided on the base 2 at a rear portion behind the moving mechanism 30. The support member 4 is composed of a vertical portion 4a extending vertically upward from the upper surface of the base 2 and a horizontal portion 4b extending horizontally from the upper end of the vertical portion 4a. The laser beam applying unit 40 includes an optical system (not illustrated) provided in the horizontal portion 4b of the support member 4. The laser beam applying unit 40 further includes focusing means 42 provided on the lower surface of the front end portion of the horizontal portion 4b. The focusing means 42 includes a focusing lens (not illustrated) for focusing a laser beam, or the like. The laser beam applying unit 40 further includes a laser oscillator (not illustrated) for oscillating a laser and emitting a laser beam. The laser beam emitted from the laser oscillator is focused by the focusing lens of the focusing means 42 and applied to a predetermined inside position in the wafer W held on the chuck table 24.

The alignment means 50 is provided on the lower surface of the front end portion of the horizontal portion 4b at a position adjacent to the focusing means 42 in the X direction. Although not illustrated, the alignment means 50 includes an arbitrary imaging device (charge-coupled device (CCD)) for imaging the workpiece by using visible light, infrared light applying means for applying infrared light to the workpiece, an optical system for capturing the infrared light applied by the infrared light applying means, and an imaging device (infrared CCD) for outputting an electrical signal corresponding to the infrared light captured by the optical system.

Figure 2:
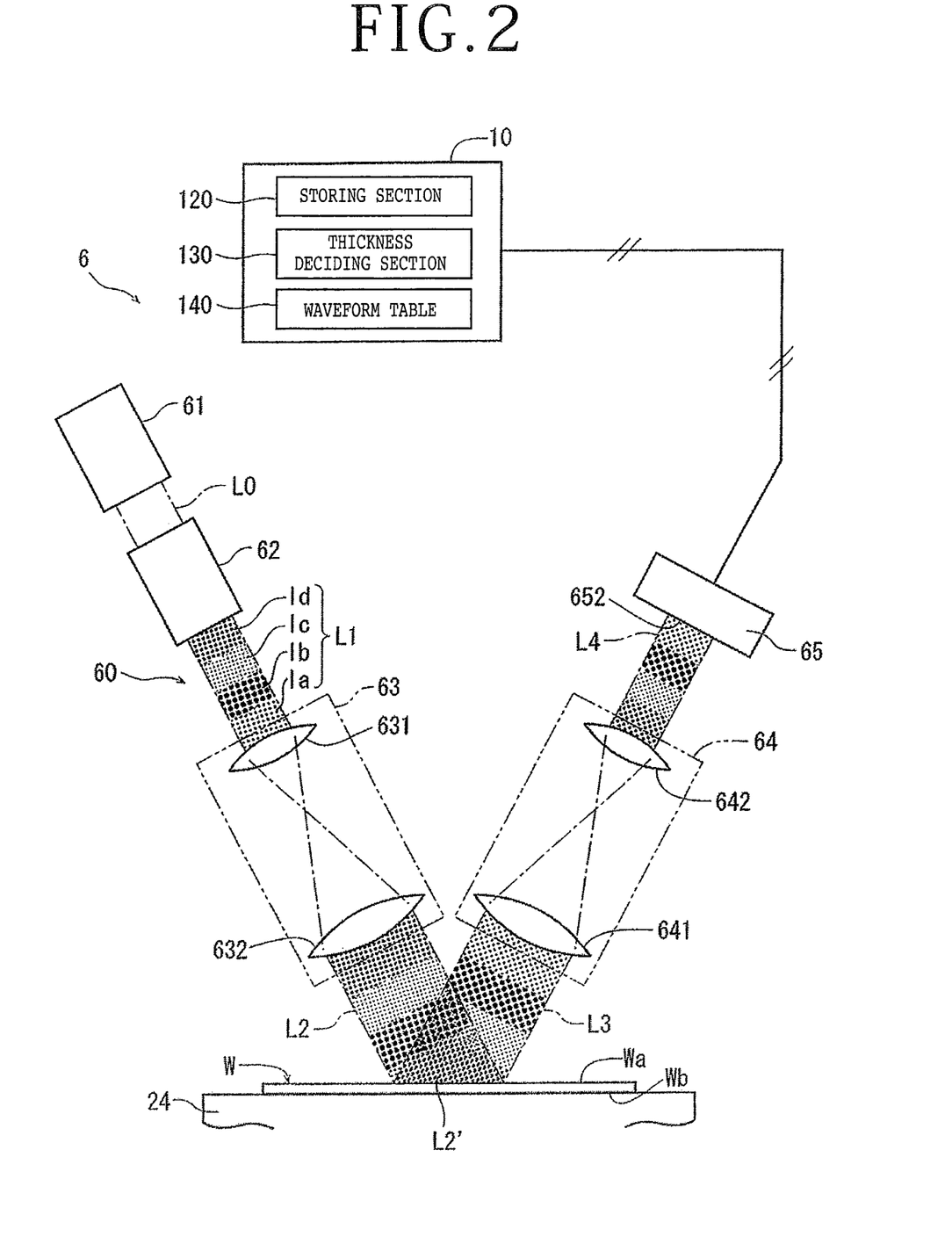
FIG. 2 is a schematic block diagram illustrating the configuration of the thickness measuring apparatus illustrated in FIG. 1.

The thickness measuring apparatus 6 will now be described with reference to FIGS. 1 to 4. The thickness measuring apparatus 6 essentially includes the chuck table 24 for holding the wafer W and the thickness measuring unit 60 for measuring the thickness of the wafer W held on the chuck table 24. As illustrated in FIG. 1, the thickness measuring unit 60 is provided on the lower surface of the front end portion of the horizontal portion 4b at a position adjacent to the alignment means 50 in the X direction. As illustrated in FIG. 2, the thickness measuring unit 60 includes a white light source 61, dispersing means 62, a magnifying optical system 63, a focusing optical system 64, a two-dimensional image sensor 65, the storing section 120, the thickness deciding section 130, and the waveform table 140. The two-dimensional image sensor 65 is connected to the control unit 10 as illustrated in FIG. 2.

Figure 3:
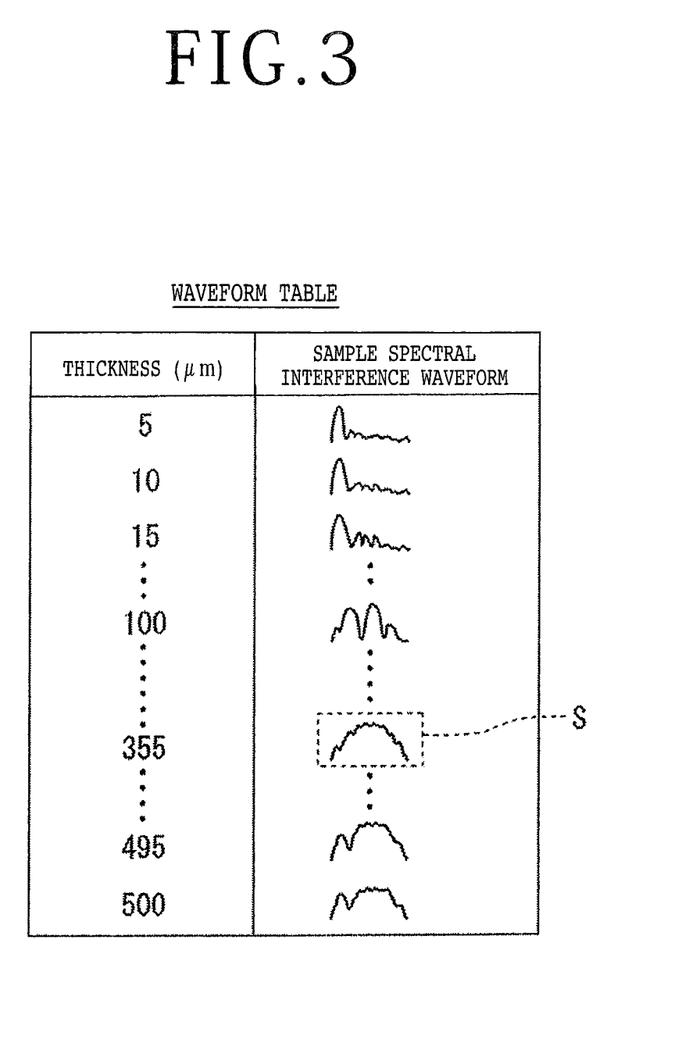
FIG. 3 is a waveform table provided in a thickness measuring unit constituting the thickness measuring apparatus illustrated in FIG. 2.

The storing section 120 may be configured by the RAM (not illustrated) included in the control unit 10, an external storage apparatus (not illustrated), or the combination thereof. The storing section 120 can store information detected by the two-dimensional image sensor 65. As illustrated in FIG. 3, the waveform table 140 is a table previously storing a plurality of kinds of sample spectral interference waveforms respectively corresponding to different thicknesses of a plate-shaped workpiece. The thickness deciding section 130 functions to decide the thickness of the wafer W according to the information (spectral interference waveform) detected by the two-dimensional image sensor 65 and the sample spectral interference waveforms stored in the waveform table 140. The thickness deciding section 130 may be configured by a computing program stored in the ROM (not illustrated) included in the control unit 10. The waveform table 140 may be prepared by a test previously conducted, simulation, or the like. The waveform table 140 is previously stored in the ROM included in the control unit 10 or in an external storage apparatus. Thickness information decided by the thickness deciding section 130 is suitably stored into the storing section 120. The storing section 120, the thickness deciding section 130, and the waveform table 140 may be configured by any apparatus independent of the control unit 10.

The white light source 61 may be selected from a SLD lamp, an ASE lamp, an SC lamp, an LED lamp, a halogen lamp, a xenon lamp, a mercury lamp, and a metal halide lamp, for example. It is preferable to select a light source for generating white light L0 including visible light in a good balance in the wavelength range of 400 to 900 nm.

As illustrated in FIG. 2, the white light L0 emitted from the white light source 61 is guided to the dispersing means 62. The dispersing means 62 is a so-called sweep device for producing time differences corresponding to the wavelengths of light components of the white light L0 emitted from the white light source 61, thereby generating spectral light L1. For example, the dispersing means 62 can be realized by using an optical fiber for producing wavelength dispersion. More specifically, the dispersing means 62 can be realized by forming a diffraction grating in an optical fiber so that the reflecting position is different according to wavelength, in which the distance traveled by the light having a short wavelength becomes short and the distance traveled by the light having a long wavelength becomes long. Accordingly, as illustrated in FIG. 2, the spectral light L1 generated from the dispersing means 62 is composed of blue light 1a, green light 1b, yellow light 1c, and red light 1d in increasing order of wavelength. That is, the blue light 1a is generated firstly, the green light 1b is generated secondly, the yellow light 1c is generated thirdly, and the red light 1d is generated last. While the dispersing means 62 is illustrated to generate the spectral light L1 composed simply of the four kinds of wavelength components (i.e., the blue light 1a, the green light 1b, the yellow light 1c, and the red light 1d) in this preferred embodiment for convenience of illustration in FIG. 2, the spectral light L1 is actually composed of more than four kinds of wavelength components. That is, each of the blue light 1a, the green light 1b, the yellow light 1c, and the red light 1d changes in color according to wavelength with time difference. Further, the gradation in color at each boundary between these wavelength components also further changes in color according to wavelength with time difference.

The spectral light L1 generated from the dispersing means 62 is guided to the magnifying optical system 63 located between the dispersing means 62 and the wafer W held on the chuck table 24. The magnifying optical system 63 is composed of a first convex lens 631 for enlarging the diameter of the beam of the spectral light L1 and a second convex lens 632 for collimating the spectral light L1 enlarged in beam diameter by the first convex lens 631. Accordingly, the spectral light L1 is enlarged in beam diameter by the magnifying optical system 63 to become magnified spectral light L2 as parallel rays of light having a beam diameter larger than that of the spectral light L1. The magnified spectral light L2 impinges on the wafer W held on the chuck table 24 at a predetermined inclination angle (incident angle) in a two-dimensional area as defined by the X direction and the Y direction on the wafer W.

The magnified spectral light L2 having impinged on the wafer W in the two-dimensional area at the predetermined inclination angle is reflected both on the upper surface Wa of the wafer W and on the lower surface Wb of the wafer W in this two-dimensional area, thereby obtaining return light L3. The return light L3 is next guided to the focusing optical system 64. The focusing optical system 64 is composed of a third convex lens 641 for focusing the return light L3 to reduce the beam diameter of the return light L3 and a fourth convex lens 642 for collimating the return light L3 reduced in beam diameter by the third convex lens 641.

Thus, the return light L3 is reduced in beam diameter by the focusing optical system 64 to become return light L4 as parallel rays of light having a beam diameter smaller than that of the return light L3. The return light L4 is next received by a photodetecting area 652 in the two-dimensional image sensor 65. This photodetecting area 652 is composed of a plurality of pixels arranged both in the X direction and in the Y direction, in which the plural pixels are defined so as to correspond to the two-dimensional area on the wafer W where the magnified spectral light L2 is applied. Each pixel outputs the intensity of each wavelength component of the return light L4 as a spectral interference waveform, which is stored into the storing section 120 of the control unit 10. The spectral interference waveform stored in the storing section 120 is compared with each sample spectral interference waveform stored in the waveform table 140. When the spectral interference waveform stored in the storing section 120 coincides with any one of the plural kinds of sample spectral interference waveforms stored in the waveform table 140, the thickness corresponding to this sample spectral interference waveform is decided as a temporary thickness. The temporary thickness is next multiplied by cos θ, where θ is a refraction angle of the magnified spectral light L2 applied to the wafer W and transmitted through the wafer W, thereby deciding an actual thickness at a predetermined coordinate position on the wafer W.

The thickness decided by the thickness deciding section 130 is then stored into the storing section 120 so as to correspond to each coordinate position on the wafer W.

The operation of the thickness measuring apparatus 6 and the laser processing apparatus 1 including the thickness measuring apparatus 6 configured above will now be described in more detail.

In performing laser processing by using the laser processing apparatus 1, the wafer W as a plate-shaped workpiece to be processed is prepared. For example, the wafer W is formed of silicon, and the front side of the wafer W is partitioned by a plurality of crossing division lines to define a plurality of separate regions where a plurality of devices are respectively formed. As described above, the wafer W is supported through the protective tape T to the ring frame F.

Thereafter, the wafer W is placed on the vacuum chuck 25 of the chuck table 24 in the holding unit 20, and the suction means (not illustrated) is operated to hold the wafer W on the vacuum chuck 25 of the chuck table 24 under suction. Thereafter, the clamps are operated to fix the ring frame F to the chuck table 24. Thereafter, the X moving mechanism 31 and the Y moving mechanism 32 are operated to move a predetermined position on the wafer W held on the chuck table 24 to the position directly below the thickness measuring unit 60.

In the condition where the chuck table 24 holding the wafer W is positioned directly below the thickness measuring unit 60, thickness measurement by the thickness measuring unit 60 is started. In starting the thickness measurement, the white light source 61 is first operated to emit the white light L0 including visible light having wavelengths of 400 to 900 nm in a good balance. The white light L0 emitted from the white light source 61 is allowed to enter the dispersing means 62. The dispersing means 62 produces time differences corresponding to the wavelengths of light components of the white light L0, thereby generating the spectral light L1. More specifically, as illustrated in FIG. 2, the dispersing means 62 sequentially generates the blue light 1a, the green light 1b, the yellow light 1c, and the red light 1d with time difference. That is, the light component having a wavelength region of 400 nm is firstly generated, the light component having a wavelength region of 500 nm is secondly generated, the light component having a wavelength of 600 nm is thirdly generated, and the light component having a wavelength region of 900 nm is last generated.

Figure 4:
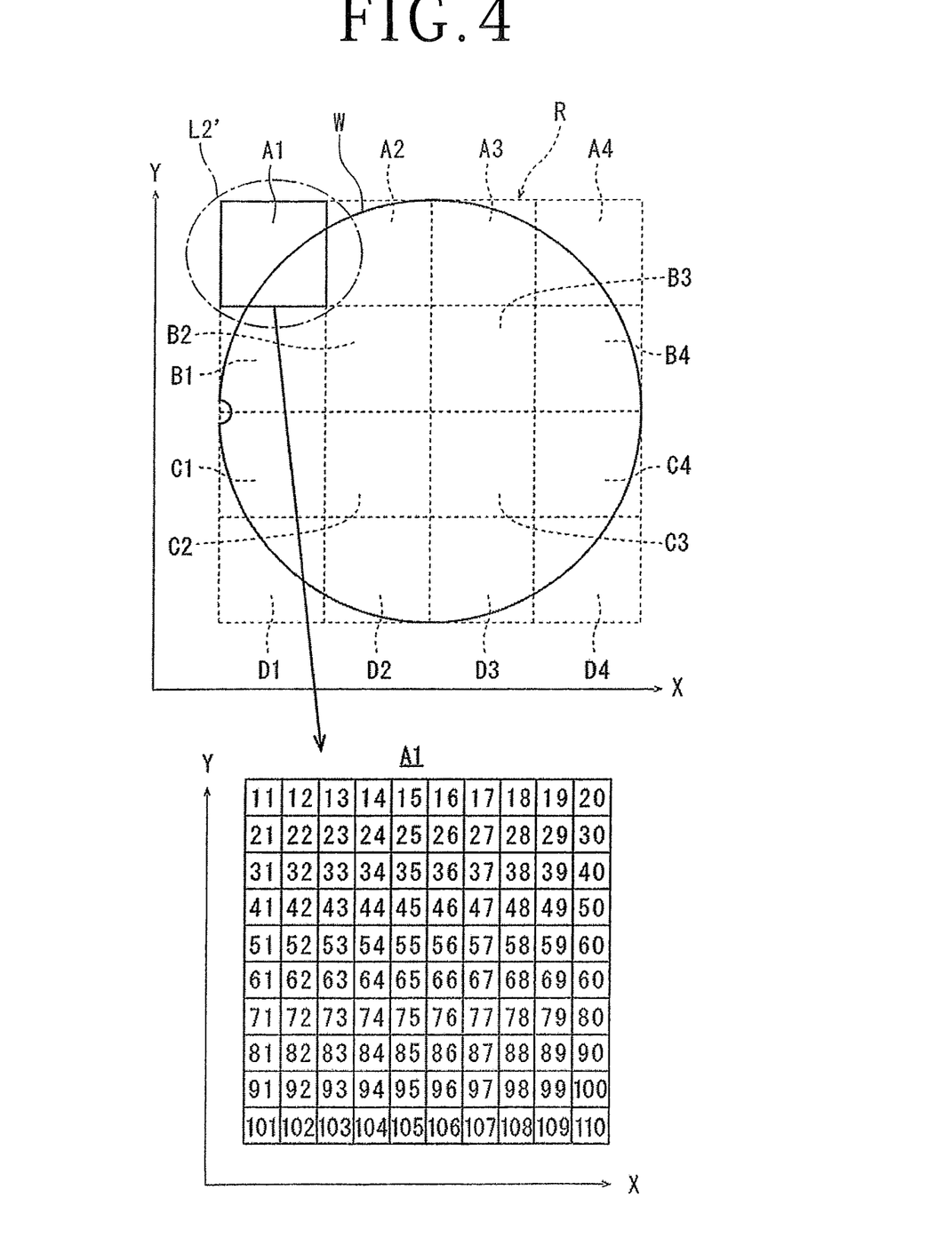
FIG. 4 is a plan view for illustrating a two-dimensional area on a wafer.

Thereafter, the spectral light L1 generated from the dispersing means 62 is guided to the magnifying optical system 63 to generate the magnified spectral light L2 enlarged in beam diameter and collimated. The magnified spectral light L2 is applied to a two-dimensional area R on the wafer W held on the chuck table 24 under suction at a predetermined inclination angle, the two-dimensional area R being defined by the X coordinates along the X direction and the Y coordinates along the Y direction as illustrated in FIG. 4. This two-dimensional area R will now be described in more detail with reference to FIG. 4.

As illustrated by broken lines in FIG. 4, the two-dimensional area R including the whole surface of the front side of the wafer W is partitioned into a plurality of sections A1 to A4, B1 to B4, C1 to C4, and D1 to D4. Each of the sections A1 to A4, each of the sections B1 to B4, each of the sections C1 to C4, and each of the sections D1 to D4 are defined by the X coordinates along the X direction and the Y coordinates along the Y direction. In the case that the magnified spectral light L2 is applied to the section A1 in the two-dimensional area R on the wafer W, the magnified spectral light L2 is applied to the wafer W as a substantially elliptical area L2', which is illustrated by a dot & dash line in FIG. 4.

As illustrated in FIG. 4, the whole of the section A1 is included in the light applied area L2'. The section A1 is further partitioned into a plurality of fine subsections arranged at X coordinates and Y coordinates as illustrated at a lower part in FIG. 4 (as illustrated by #11 to #110). Accordingly, the subsection information specifies the positions of these fine subsections in the section A1 with the X coordinates and the Y coordinates. Each of the other sections A2 to A4, B1 to B4, C1 to C4, and D1 to D4 is also similarly partitioned into a plurality of fine subsections. Accordingly, a predetermined position on the wafer W can be specified by the X coordinates and the Y coordinates. As illustrated in FIG. 2, the magnified spectral light L2 applied to the wafer W is reflected both on the upper surface Wa of the wafer W and on the lower surface Wb of the wafer W in the light applied area L2', thereby obtaining the return light L3. The return light L3 is next allowed to enter the focusing optical system 64. The return light L3 having entered the focusing optical system 64 is reduced in beam diameter and then collimated to obtain the return light L4. The return light L4 is next detected by the photodetecting area 652 of the two-dimensional image sensor 65.

Figure 5:
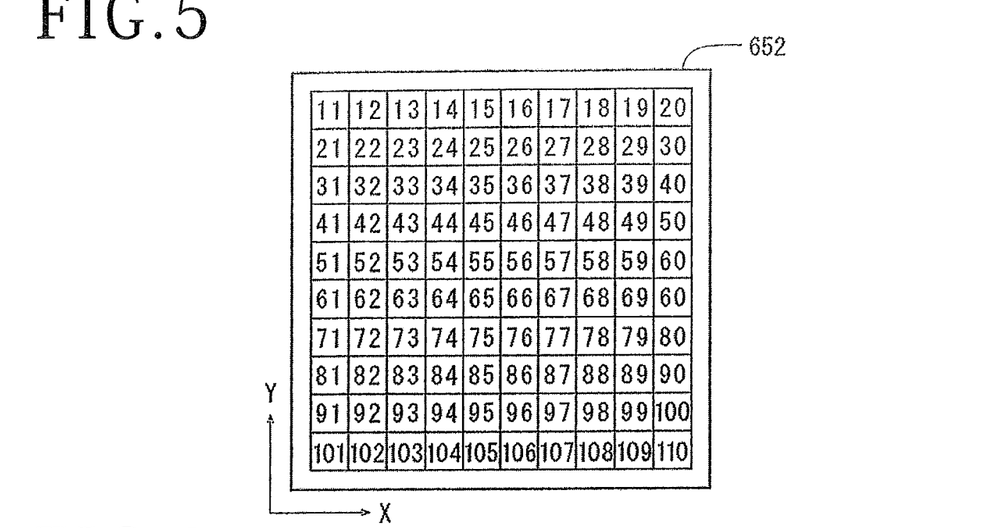
FIG. 5 is a plan view illustrating a photodetecting area of a two-dimensional image sensor set so as to corresponding to the two-dimensional area on the wafer illustrated in FIG. 4.

As illustrated in FIG. 5, the photodetecting area 652 of the two-dimensional image sensor 65 includes a plurality of pixels #11 to #110 respectively corresponding to the subsections #11 to #110 illustrated in FIG. 4. These pixels #11 to #110 are arranged at the X coordinates and the Y coordinates as corresponding to those in each of the sections A1 to D4 of the two-dimensional area R on the wafer W. Accordingly, the return light L4 reflected on the subsection #110 in the section A1 of the two-dimensional area R on the wafer W, for example, is detected by the pixel #110 of the photodetecting area 652. Thus, the return light L4 reflected on the subsections #11 to #110 in the section A1 is detected by the pixels #11 to #110 of the photodetecting area 652, respectively, because the pixels #11 to #110 respectively correspond to the subsections #11 to #110. The return light L4 to be detected by the pixels #11 to #110 is return light obtained by the reflection of the magnified spectral light L2 on the upper surface Wa of the wafer W and on the lower surface Wb of the wafer W. Accordingly, the intensity of the return light L4 having wavelength components to be detected by each pixel with time difference is output as a spectral interference waveform H illustrated in FIG. 6. The spectral interference waveform H output from each pixel is sent to the control unit 10. The spectral interference waveforms H respectively corresponding to the pixels #11 to #110 are stored into the storing section 120 of the control unit 10.

Figure 6:
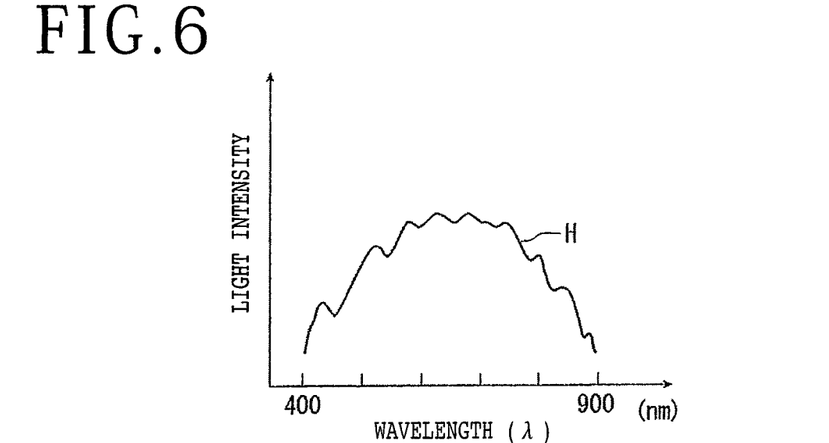
FIG. 6 is a graph illustrating a spectral interference waveform produced by the thickness measuring unit.
Figure 7:
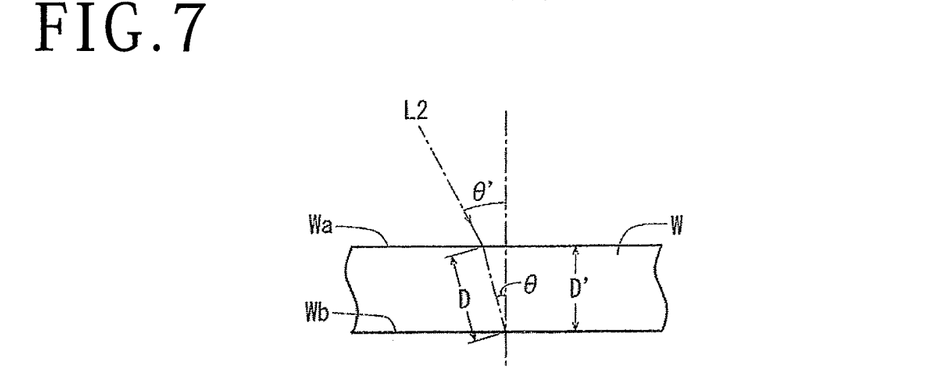
FIG. 7 is a side view for illustrating a temporary thickness and an actual thickness of the wafer as decided by a thickness deciding section.

There will now be described the procedure of computing the thickness by using the thickness deciding section 130 according to the spectral interference waveforms H stored in the storing section 120. It is assumed that the spectral interference waveform H illustrated in FIG. 6 is a spectral interference waveform output from the pixel #110 in the photodetecting area 652 illustrated in FIG. 5. In this case, the thickness deciding section 130 decides the thickness of the subsection #110 in the section A1 on the wafer W corresponding to the pixel #110. In this case, the thickness deciding section 130 compares the spectral interference waveform H sent from the pixel #110 and stored into the storing section 120 with each sample spectral interference waveform stored in the waveform table 140 and then determines whether or not the spectral interference waveform H coincides with each sample spectral interference waveform. More specifically, the spectral interference waveform H is compared with each sample spectral interference waveform to determine the sample spectral interference waveform having the highest degree of coincidence in shape and phase. In this preferred embodiment, it is determined that the spectral interference waveform H output from the pixel #110 coincides with a sample spectral interference waveform S stored in the waveform table 140 with the highest degree of coincidence as illustrated in FIG. 3. The sample spectral interference waveform S stored in the waveform table 140 corresponds to a thickness of 355 µm, so that the thickness deciding section 130 can decide that this thickness of 355 µm is the thickness detected according to the optical path difference between the light reflected on the upper surface Wa of the wafer W and the light reflected on the lower surface Wb of the wafer W in the subsection #110 of the section A1. As illustrated in FIG. 7, this optical path difference is formed by an optical path of the magnified spectral light L2 having entered the wafer W at a predetermined angle θ'. At this time, the magnified spectral light L2 applied to the wafer W at the predetermined angle θ' advances in the wafer W at a refraction angle θ. Thereafter, the magnified spectral light L2 is reflected on the lower surface Wb of the wafer W to obtain the return light L3. Accordingly, the thickness information (355 µm) obtained from the spectral interference waveform H and the sample spectral interference waveform S is given by the light advancing in the wafer W at the refraction angle θ. That is, the thickness information obtained above is not an actual thickness of the wafer W. Accordingly, an optical path length D (355 µm) of the light advancing in the wafer W at the refraction angle θ is once set to a temporary thickness D. When it is assumed that the refraction angle θ is 20°, an actual thickness D' can be determined according to the temporary thickness D (355 µm) as follows:

$$D'=D \times \cos 20° \approx 333.6 \text{ µm}$$

Information regarding the actual thickness D' as described above is stored into the storing section 120. Further, information regarding the X coordinate and the Y coordinate for specifying the subsection #110 in the section A1 is also stored into the storing section 120. Similar decision is also performed to the other subsections #11 to #109 in the section A1, and the information regarding the actual thickness D' in each subsection obtained is stored into the storing section 120. Further, the information regarding the X coordinate and the Y coordinate for deciding the thickness in each subsection is also stored into the storing section 120.

As described above, the thickness measuring apparatus 6 includes the dispersing means 62 for producing time differences corresponding to the wavelengths of light components of the white light L0, thereby generating the spectral light L1. Accordingly, the spectral interference waveforms formed according to the thicknesses of all the subsections constituting each section on the wafer W can be obtained at one time. Accordingly, decision of the thicknesses of all the subsections #11 to #110 can be performed at one time. That is, the thicknesses in a wide area of the wafer W can be measured efficiently at one time.

According to the procedure mentioned above, the thicknesses of all the subsections #11 to #110 constituting the section A1 can be decided quickly and efficiently. After storing the thickness of each subsection in the section A1 into the storing section 120, the moving mechanism 30 is operated to move the chuck table 24 to the position directly below the thickness measuring unit 60 so that the section A2 adjacent to the section A1 is set in the light applied area L2' of the magnified spectral light L2. Thereafter, the decision of the thickness of the section A2 is performed in a manner similar to the above decision of the thickness of the section A1. The section A2 is also composed of subsections #11 to #110, and the thicknesses of the subsections #11 to #110 in the section A2 can be decided quickly and then stored into the storing section 120. Similar decision is also performed to the other sections A3 to A4, B1 to B4, C1 to C4, and D1 to D4. Thusly, the thickness of the whole of the two-dimensional area R of the wafer W can be decided efficiently and then stored into the storing section 120 in the control unit 10.

After measuring the thickness of the whole of the two-dimensional area R of the wafer W, a modified layer as a division start point is formed inside the wafer W along each division line in the following manner. More specifically, the alignment means 50 in the laser processing apparatus 1 illustrated in FIG. 1 is operated to perform alignment between the processing position of the wafer W and the applying position of the laser beam by the laser beam applying unit 40. After performing the alignment, the wafer W is positioned directly below the focusing means 42, and the laser beam applying unit 40 is started. That is, a laser beam having a transmission wavelength to the wafer W is generated from the laser oscillator (not illustrated) provided in the laser beam applying unit 40. At this time, the focal point of the laser beam is set inside the wafer W at a predetermined depth below a predetermined division line. Thereafter, the X moving mechanism 31 is operated to move the chuck table 24 in the X direction at a predetermined feed speed, so that the laser beam is applied along this predetermined division line to thereby form a modified layer inside the wafer W along this predetermined division line. As described above, the thickness in each subsection of the two-dimensional area R as defined by the X and Y coordinate positions on the wafer W held on the chuck table 24 is previously measured and stored in the storing section 120. Accordingly, according to the thickness information stored in the storing section 120, the focal point of the laser beam can be set inside the wafer W at a predetermined position based on the upper surface Wa. All of the laser beam applying unit 40, the X moving mechanism 31, the Y moving mechanism 32, the rotational drive means (not illustrated) for rotating the chuck table 24, and the like are controlled by the control unit 10 to thereby form a plurality of modified layers as division start points inside the wafer W along all of the crossing division lines, respectively.

For example, the laser processing for forming the modified layers inside the wafer W by using the laser beam applying unit 40 may be performed under the following conditions.

Wavelength: 1064 nm
Average power: 1 W
Repetition frequency: 100 kHz
Pulse width: 1 ns
Spot diameter: 1 μm
Feed speed: 100 mm/s According to this preferred embodiment, the thickness in each subsection of the two-dimensional area R as defined by the X and Y coordinate positions on the wafer W held on the chuck table 24 is previously measured efficiently and stored in the storing section 120. Accordingly, by applying the thickness information stored in the storing section 120 to the laser processing apparatus 1, the modified layer is formed inside the wafer W at a predetermined depth along each division line. That is, the laser processing using the laser processing apparatus 1 can be efficiently performed.

The present invention is not limited to the above preferred embodiment, but various modifications may be made. In the above preferred embodiment, the white light L0 emitted from the white light source 61 in the thickness measuring unit 60 is dispersed according to wavelength by the dispersing means 62 to obtain the spectral light L1. The spectral light L1 is next expanded in beam diameter by the magnifying optical system 63 to obtain the magnified spectral light L2 as a collimated beam. The magnified spectral light L2 is applied to the two-dimensional area R of the wafer W to obtain the return light L3. The return light L3 is next reduced in beam diameter by the focusing optical system 64 to obtain the return light L4. The return light L4 is next detected by the two-dimensional image sensor 65 to measure the thickness of the wafer W. As a modification, the magnifying optical system 63 and the focusing optical system 64 may be omitted. In this case, the spectral light L1 generated from the dispersing means 62 may be directly applied to the wafer W, and the return light L3 may be detected by the two-dimensional image sensor 65. Further, in the above preferred embodiment, the two-dimensional area R of the wafer W is partitioned into the sixteen sections (i.e., A1 to A4, B1 to B4, C1 to C4, and D1 to D4), and the magnified spectral light L2 is formed and applied to the wafer W by the magnifying optical system 63 so as to correspond to each section of the two-dimensional area R, thereby deciding the thickness of the wafer W in each section. As a modification, the range (area) of each section may be suitably changed according to the size of the wafer W and the number of points (sections) where the thickness is to be measured. Further, in accordance with this change, the magnification of the magnifying optical system 63 may be suitably adjusted.

Further, in the above preferred embodiment, the thickness measuring apparatus 6 is applied to the laser processing apparatus 1 for forming a modified layer inside the wafer W along each division line. As a modification, the present invention may be applied to any processing apparatus for processing a plate-shaped workpiece. For example, the present invention may be applied to an apparatus for grinding or polishing the surface of the plate-shaped workpiece, a laser processing apparatus for performing ablation to the plate-shaped workpiece in the condition where the focal point of a laser beam is set on the surface of the plate-shaped workpiece, a dicing apparatus for cutting the plate-shaped workpiece by using a cutting blade, or the like. Thus, the present invention may be applied to any processing apparatus requiring information regarding the thickness of the plate-shaped workpiece, so that the present invention can contribute to an improvement in processing efficiency.

Further, while the thickness measuring apparatus 6 is included in the laser processing apparatus 1 in the above preferred embodiment, the thickness measuring apparatus according to the present invention may be independent of the processing apparatus. In this case, the thickness information measured and stored by the thickness measuring apparatus may be suitably transmitted to the processing apparatus in processing the workpiece.

The present invention is not limited to the details of the above described preferred embodiment. The scope of the invention is defined by the appended claims and all changes and modifications as fall within the equivalence of the scope of the claims are therefore to be embraced by the invention.

What is claimed is:
1. A thickness measuring apparatus for measuring a thickness of a plate-shaped workpiece having an upper surface and a lower surface, comprising:
　a chuck table for holding the workpiece; and
　a thickness measuring unit measuring the thickness of the workpiece held on the chuck table in a noncontact fashion, wherein
　the thickness measuring unit includes:
　　a white light source for emitting white light,
　　dispersing means producing time differences corresponding to wavelengths of light components of the white light emitted from the white light source, thereby generating spectral light, the spectral light generated by the dispersing means being applied to a two-dimensional area on the workpiece held on the chuck table at a predetermined inclination angle, the two-dimensional area being composed of a plurality of sections defined by X coordinates and Y coordinates,
　　a two-dimensional image sensor having a photodetecting area for detecting return light obtained by reflecting the spectral light on the upper surface of the workpiece and the lower surface of the workpiece, the photodetecting area including a plurality of pixels defined by X coordinates and Y coordinates so as to respectively correspond to the X coordinates and the Y coordinates defining the plurality of sections of the two-dimensional area on the workpiece, a storing section for storing intensity of the return light detected by the plurality of pixels according to wavelength with time difference, the intensity of the return light detected by each pixel being stored as a spectral interference waveform, and a waveform table previously storing a plurality of kinds of sample spectral interference waveforms respectively corresponding to different thicknesses of the workpiece, and a thickness deciding section for deciding a thickness at an X-Y coordinate position in the two-dimensional area of the workpiece, wherein the thickness deciding section decides the thickness as an actual thickness by comparing the spectral interference waveform stored in the storing section with each sample spectral interference waveform stored in the waveform table, next deciding a thickness corresponding to the sample spectral interference waveform coinciding with the spectral interference waveform as a temporary thickness, and next multiplying the temporary thickness by a cos θ, where θ is a refraction angle of the spectral light applied to the upper surface of the workpiece and advancing in the workpiece toward the lower surface thereof.

2. The thickness measuring apparatus according to claim 1, wherein the thickness measuring unit further includes a magnifying optical system interposed between the dispersing means and the workpiece held on the chuck table for enlarging a beam diameter of the spectral light generated from the dispersing means, and a focusing optical system for reducing a beam diameter of the return light reflected from the workpiece held on the chuck table and then guiding the return light to the two-dimensional image sensor.

3. The thickness measuring apparatus according to claim 1, wherein the white light source is selected from a group consisting of a super luminescent diode lamp, an amplified spontaneous emission lamp, a super continuum lamp, a light emitting diode lamp, a halogen lamp, a xenon lamp, a mercury lamp, and a metal halide lamp.

* * * * *